US008327119B2

(12) United States Patent
Pogor (10) Patent No.: US 8,327,119 B2
(45) Date of Patent: Dec. 4, 2012

(54) APPARATUS AND METHOD FOR EXECUTING FAST BIT SCAN FORWARD/REVERSE (BSR/BSF) INSTRUCTIONS

(75) Inventor: Bryan Wayne Pogor, Round Rock, TX (US)

(73) Assignee: VIA Technologies, Inc., New Taipei (TW)

( * ) Notice: Subject to any disclaimer, the term of this patent is extended or adjusted under 35 U.S.C. 154(b) by 714 days.

(21) Appl. No.: 12/582,907

(22) Filed: Oct. 21, 2009

(65) Prior Publication Data

US 2011/0016296 A1 Jan. 20, 2011

Related U.S. Application Data

(60) Provisional application No. 61/225,821, filed on Jul. 15, 2009.

(51) Int. Cl.
G06F 7/38 (2006.01)
G06F 9/00 (2006.01)
G06F 9/44 (2006.01)
G06F 7/00 (2006.01)
G06F 15/00 (2006.01)

(52) U.S. Cl. ........................................ 712/220; 708/210
(58) Field of Classification Search .................. None
See application file for complete search history.

(56) References Cited

U.S. PATENT DOCUMENTS

2006/0156067 A1* 7/2006 Swoboda ........................ 714/38
2010/0082718 A1* 4/2010 Ramanarayanan et al. .. 708/210

* cited by examiner

Primary Examiner — Eddie P Chan
Assistant Examiner — William B Partridge
(74) Attorney, Agent, or Firm — E. Alan Davis; James W. Huffman (57) ABSTRACT

An apparatus executes a bit scan instruction that specifies an N-byte input operand. A first encoder forward bit scan encodes each input byte to generate N first bit vectors. A zero detector zero-detects each input byte to generate a second bit vector. A second encoder forward bit scan encodes the second bit vector to generate a third bit vector. An N:1 multiplexor, controlled by the third bit vector, selects one of the N first bit vectors to output a fourth bit vector. The apparatus concatenates the third and fourth bit vectors into a fifth bit vector that indicates the bit index of the least significant set bit of the input operand. A third encoder forward bit scan encodes a bit-reversed version of each input by to generate N sixth bit vectors. A fourth encoder forward bit scan encodes a bit-reversed version of the second bit vector to generate a seventh bit vector. A second N:1 multiplexor, controlled by the seventh bit vector, selects one of the N sixth bit vectors to output an eighth bit vector. Selection logic selects a concatenation of the third and fourth bit vectors into the fifth bit vector if an input indicates forward bit scan, and the selection logic selects an inverted version of a concatenation of the seventh and eighth bit vectors into the fifth bit vector if the input indicates reverse bit scan.

40 Claims, 4 Drawing Sheets

*second microinstruction (Alternate Embodiment)*

APPARATUS AND METHOD FOR EXECUTING FAST BIT SCAN FORWARD/REVERSE (BSR/BSF) INSTRUCTIONS

CROSS REFERENCE TO RELATED APPLICATION(S)

This application claims priority based on U.S. Provisional Application Ser. No. 61/225,821, filed Jul. 15, 2009, entitled APPARATUS AND METHOD FOR EXECUTING FAST BIT SCAN FORWARD/REVERSE (BSR/BSF) INSTRUCTIONS, which is hereby incorporated by reference in its entirety.

FIELD OF THE INVENTION

The present invention relates in general to the field of microprocessors, and particularly to bit scan instructions executed thereby.

BACKGROUND OF THE INVENTION

The x86 instruction set architecture includes bit scan forward (BSF) and bit scan reverse (BSR) instructions, referred to generically as Bit Scan instructions. Prior microprocessors have implemented these instructions in microcode. That is, when an instruction translator of the microprocessor encounters these instructions, it transfers control to microcode routines stored in a microcode ROM which require many clock cycles to execute the instructions. Therefore, what is needed is a faster way to execute these instructions.

BRIEF SUMMARY OF INVENTION

In one aspect the present invention provides a hardware apparatus in a microprocessor for executing a bit scan instruction, wherein the bit scan instruction specifies an input operand comprising N bytes, wherein N is at least two. The apparatus includes a first encoder configured to forward bit scan encode each of the N bytes of the input operand to generate N first bit vectors. The apparatus also includes a zero detector configured to zero-detect each of the N bytes of the input operand to generate a second bit vector. The apparatus also includes a second encoder configured to forward bit scan encode the second bit vector to generate a third bit vector. The apparatus also includes an N:1 multiplexor controlled by the third bit vector to select one of the N first bit vectors to output a fourth bit vector. The apparatus concatenates the third and fourth bit vectors into a fifth bit vector that indicates the bit index of the least significant set bit of the input operand. In one embodiment, the apparatus handles both forward and reverse bit scan instructions. A third encoder forward bit scan encodes a bit-reversed version of each input by to generate N sixth bit vectors. A fourth encoder forward bit scan encodes a bit-reversed version of the second bit vector to generate a seventh bit vector. A second N:1 multiplexor, controlled by the seventh bit vector, selects one of the N sixth bit vectors to output an eighth bit vector. Selection logic selects a concatenation of the third and fourth bit vectors into the fifth bit vector if an input indicates forward bit scan, and the selection logic selects an inverted version of a concatenation of the seventh and eighth bit vectors into the fifth bit vector if the input indicates reverse bit scan. In one embodiment, the apparatus handles input operand sizes of either 2, 4 or 8 bytes. Zero mask logic receives an 8-byte value from an 8-byte register that stores the input operand and zero masks the 8-byte value for provision to the first encoder and to the zero detector. The zero mask logic masks to zero bytes 2 through 7 of the 8-byte value when the bit scan instruction specifies a 2-byte input operand and masks to zero bytes 4 through 7 of the 8-byte value when the bit scan instruction specifies a 4-byte input operand.

In another aspect, the present invention provides a microprocessor. The microprocessor includes an instruction translator configured to translate a bit scan instruction into one or more microinstructions, wherein the bit scan instruction specifies an input operand comprising N bytes, wherein N is at least two. The microprocessor also includes at least one execution unit configured to execute the one or more microinstructions. The at least one execution unit includes a first encoder configured to forward bit scan encode each of the N bytes of the input operand to generate N first bit vectors. The at least one execution unit also includes a zero detector, configured to zero-detect each of the N bytes of the input operand to generate a second bit vector. The at least one execution unit also includes a second encoder configured to forward bit scan encode the second bit vector to generate a third bit vector. The at least one execution unit also includes an N:1 multiplexor controlled by the third bit vector to select one of the N first bit vectors to output a fourth bit vector. The microprocessor concatenates the third and fourth bit vectors into a fifth bit vector that indicates the bit index of the least significant set bit of the input operand.

In yet another aspect, the present invention provides a method for executing a bit scan instruction in a microprocessor, wherein the bit scan instruction specifies an input operand comprising N bytes, wherein N is at least two. The method includes forward bit scan encoding each of the N bytes of the input operand to generate N first bit vectors. The method also includes zero-detecting each of the N bytes of the input operand to generate a second bit vector. The method also includes forward bit scan encoding the second bit vector to generate a third bit vector. The method also includes selecting based on the third bit vector one of the N first bit vectors to output a fourth bit vector. The method also includes concatenating the third and fourth bit vectors into a fifth bit vector that indicates the bit index of the least significant set bit of the input operand.

DETAILED DESCRIPTION OF THE INVENTION

Embodiments of a microprocessor are described herein that execute the Bit Scan instructions in hardware rather than microcode in order to significantly reduce the number of clock cycles each Bit Scan instruction takes to execute.

Figure 1:
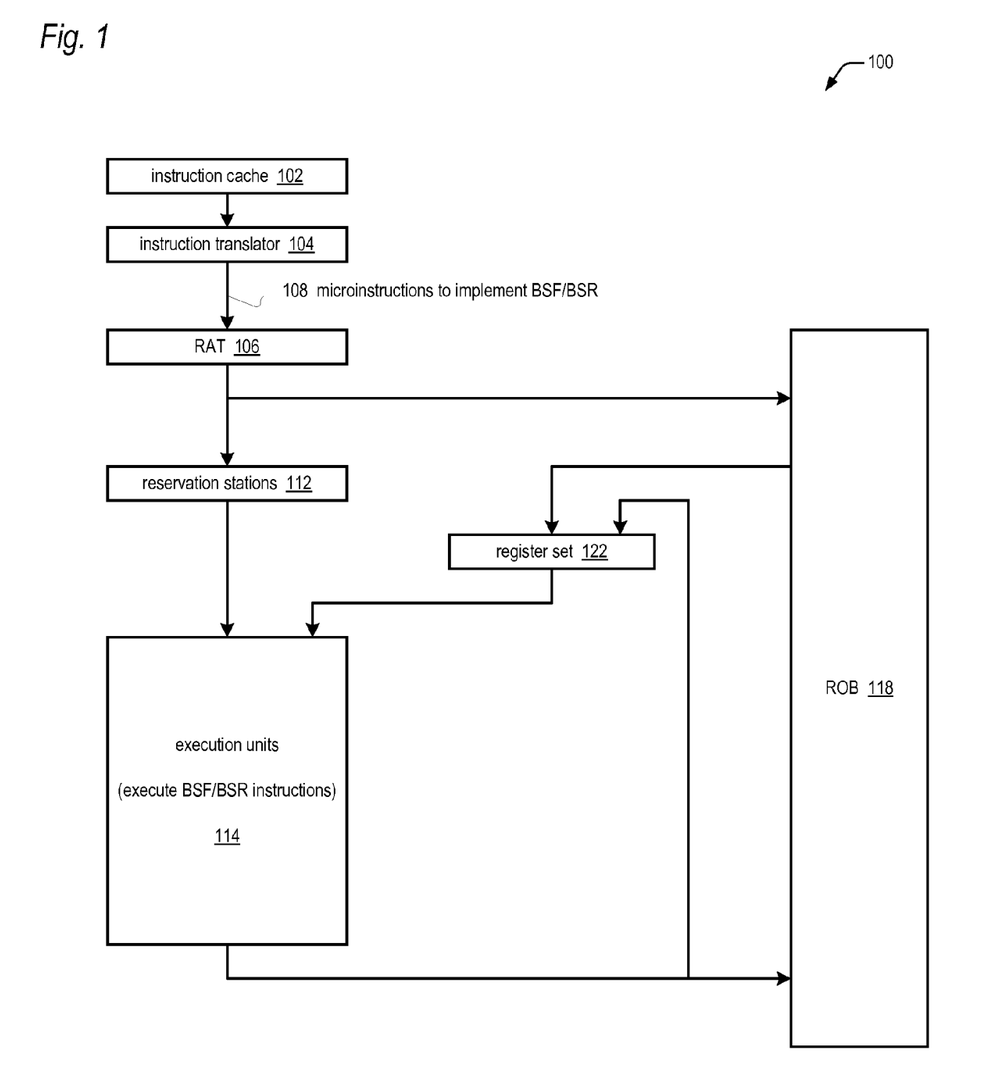
FIG. 1 is a block diagram illustrating a microprocessor according to the present invention.

Referring now to FIG. 1, a block diagram illustrating a microprocessor 100 according to the present invention is shown. According to one embodiment, the microprocessor 100 is an out-of-order execution microprocessor that includes an instruction cache 102 for caching program instructions, including Bit Scan instructions. The microprocessor 100 includes an instruction translator 104 that translates macroinstructions into microinstructions 108, such as microinstructions to implement the Bit Scan macroinstructions. In one embodiment, the instruction translator 104 generates two microinstructions 108 in response to encountering a Bit Scan instruction. Each of the microinstructions 108 takes one clock cycle to execute by its respective execution unit 114. However, another embodiment is contemplated in which the instruction translator 104 generates a single microinstruction 108 in response to encountering a Bit Scan instruction, particularly where the clock cycle time of the microprocessor 100 permits the logic of FIGS. 2A and 2B/3 (described below) to generate a result in a single clock cycle.

A register alias table (RAT) 106 generates dependencies for the microinstructions 108. In particular, in the embodiment in which the instruction translator 104 generates two microinstructions 108 in response to encountering a Bit Scan instruction, the RAT 106 generates a dependency of the second microinstruction upon the result of the first microinstruction. The RAT 106 dispatches the microinstructions 108 to reservation stations 112. The reservation stations 112 issue the microinstructions 108 to their respective execution units 114 when the microinstructions 108 are ready for execution, i.e., when their dependencies are satisfied and an execution unit 114 is available.

Specifically, an execution unit 114 exists to execute the microinstructions 108 generated by the instruction translator 104 to implement the Bit Scan instructions. The execution units 114 also receive operands from a general purpose register set 122. In particular, the source operand of a Bit Scan instruction is received from the general purpose register set 122, and the result of the Bit Scan instruction is written back to the general purpose register set 122. A reorder buffer (ROB) 118 insures in-order retirement of the microinstructions 108 and their associated macroinstructions.

There are six basic operations that the Bit Scan instructions can specify. This is because they can specify a 16-bit, 32-bit, or 64-bit source operand, and for each operand size they can specify a forward scan (BSF) to find the least significant set bit ('1' bit) or a reverse scan (BSR) to find the most significant set bit of the source operand. Generally speaking, the one or more execution units 114 that execute the Bit Scan instructions reduce the six basic operations into a single 64-bit forward scan operation by masking off the relevant upper bits of the source operand, reversing the bit order of the resulting eight bytes at appropriate times, performing forward bit scan and zero-detect operations on each of the bytes, and inverting the result when necessary, as described below in detail.

Figure 2A:
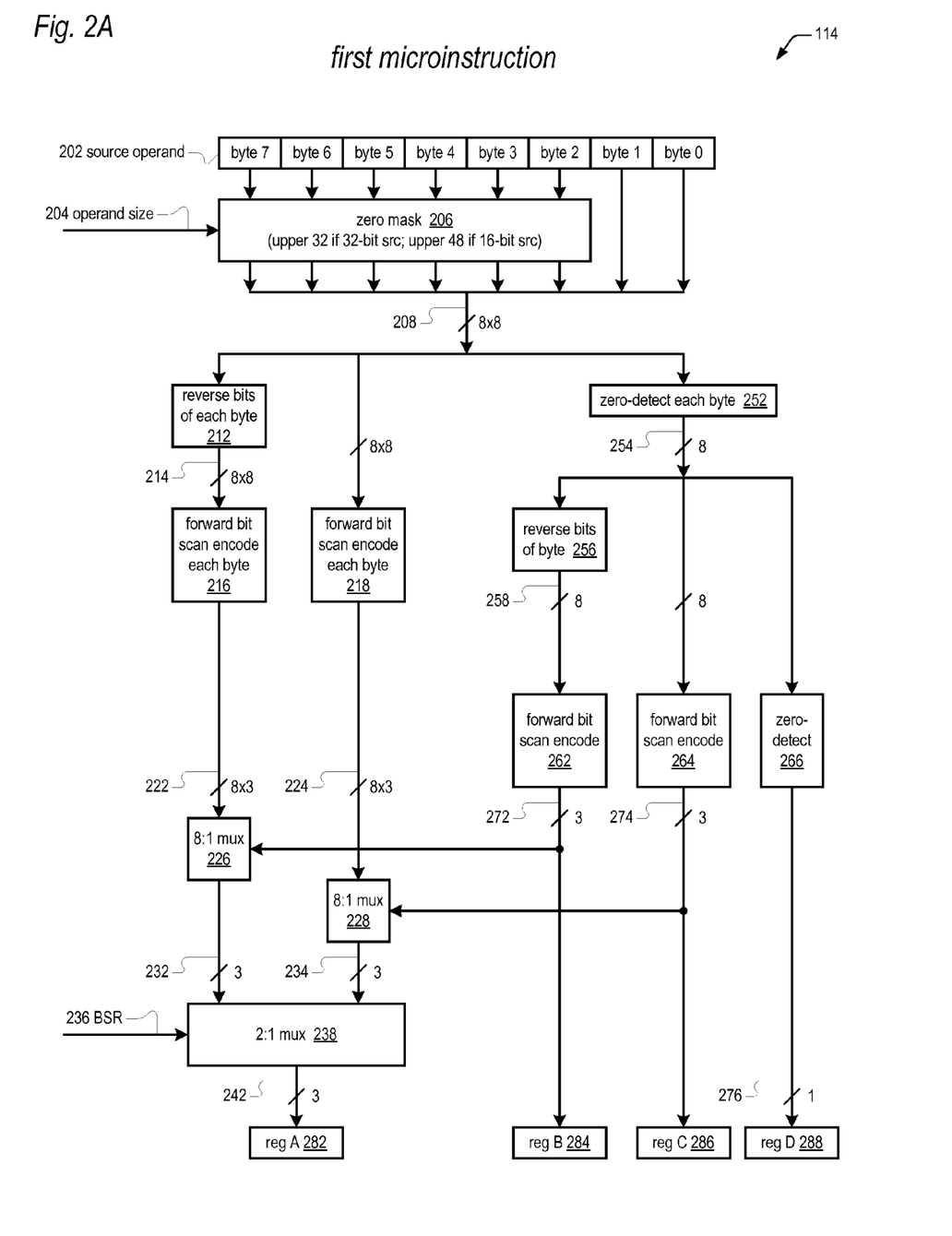
FIGS. 2A and 2B are block diagrams illustrating in detail portions of the execution unit of FIG. 1 that executes the microinstructions that implement the Bit Scan instructions (BSF/BSR) according to the present invention is shown.
Figure 2B:
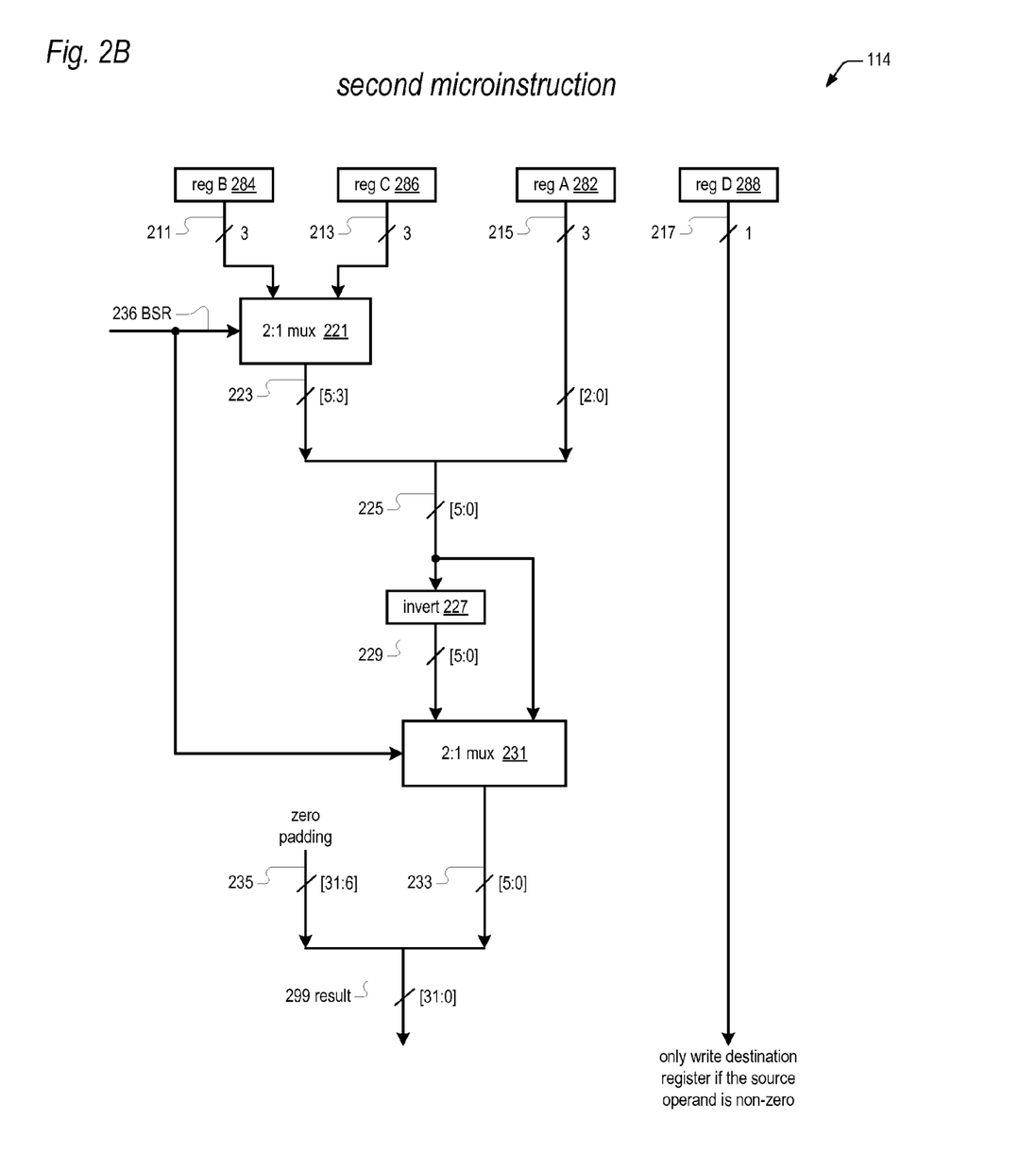

Referring now to FIG. 2, a block diagram illustrating in detail portions of the execution unit 114 of FIG. 1 that executes the microinstructions 108 that implement the Bit Scan instructions (BSF/BSR) according to the present invention is shown. FIGS. 2A and 2B are referred to collectively as FIG. 2. According to the embodiment shown, FIG. 2A describes the portions of the execution unit 114 that executes the first microinstruction 108 that implements the Bit Scan instructions, and FIG. 2B describes the portions of the execution unit 114 that executes the second microinstruction 108 that implements the Bit Scan instruction.

The execution unit 114 of FIG. 2A includes a source operand 202 of the Bit Scan instruction. The Bit Scan instruction may specify the size of the source operand 204 as either 16 bits, 32 bits, or 64 bits. Regardless of the size of the source operand 202, the execution unit 114 receives all eight bytes of the 64-bit source register specified by the Bit Scan instruction. (In the case of a Bit Scan instruction that specifies a source operand from memory, the instruction translator 104 generates a load microinstruction to load the source operand 202 from memory, and the first microinstruction is dependent upon the load.) The least significant byte of the source operand 202 is denoted byte 0, the next byte 1, and so forth to byte 7, which is the most significant byte.

Zero mask logic 206 receives bytes 2 through 7 and masks to zero all bits of bytes 2 through 7 if the Bit Scan instruction specifies a 16-bit source operand 202, masks to zero all bits of bytes 4 through 7 if the Bit Scan instruction specifies a 32-bit source operand 202, and does nothing to the source operand 202 if the Bit Scan instruction specifies a 64-bit source operand 202. The output of the zero mask logic 26 concatenated with bytes 0 and 1 is an 8-byte result 208.

Logic 212 reverses the bits of each individual byte of the result 208 to generate an 8-byte reversed result 214. That is, within each byte, bit 0 is moved to bit position 7, bit 1 is moved to bit position 6, bit 2 is moved to bit position 5, bit 3 is moved to bit position 4, bit 4 is moved to bit position 3, bit 5 is moved to bit position 2, bit 6 is moved to bit position 1, and bit 7 is moved to bit position 0.

Logic 216 receives the bit-reversed result 214 and performs a forward bit scan encode operation on each byte to generate eight 3-bit results 222. Each of the eight encoded 3-bit results 222 is an unsigned integer value that specifies the bit index of the least significant set bit ('1' bit) within the corresponding bit-reversed byte 214.

Logic 218 receives the result 208 and performs a forward bit scan encode operation on each byte to generate eight 3-bit results 224. Each of the eight encoded 3-bit results 224 is an unsigned integer value that specifies the bit index of the least significant set bit ('1' bit) within the corresponding byte 208.

A first 8:1 mux 226 receives on its eight inputs the eight 3-bit encoded results 222 and selects one of them as its single 3-bit output 232 based on a control input 272. A second 8:1 mux 228 receives on its eight inputs the eight 3-bit encoded results 224 and selects one of them as its single 3-bit output 234 based on a control input 274. A 2:1 mux 238 receives on its two inputs the outputs 232 and 234 of the muxes 226 and 228 and selects one of them as its single 3-bit output 242 based on a control input 236. The mux 238 selects input 232 (i.e., the selected forward bit scan encoded bit-reversed result) if the control input 236 indicates the instruction is a BSR instruction; conversely, the mux 238 selects input 234 (i.e., the selected forward bit scan encoded non-bit-reversed result) if the control input 236 indicates the instruction is a BSF instruction. The output 242 of mux 238 is stored in a register A 282 for provision to the second microinstruction.

Logic 252 performs a zero-detect operation on each byte of result 208 to generate an 8-bit result 254. Each bit of the result 254 is false if its corresponding byte 208 is zero.

Logic 256 reverses the bits of result 254 to generate an 8-bit reversed result 258.

Logic 262 receives the bit-reversed result 258 and performs a forward bit scan encode operation to generate a 3-bit result 272, which is the control input to mux 226. The encoded 3-bit result 272 is an unsigned integer value that specifies the bit index of the least significant set bit ('1' bit) within the bit-reversed result 258. The output 272 of logic 262 is stored in a register B 284 for provision to the second microinstruction.

Logic 264 receives the result 254 and performs a forward bit scan encode operation to generate a 3-bit result 274, which is the control input to mux 228. The encoded 3-bit result 274 is an unsigned integer value that specifies the bit index of the least significant set bit ('1' bit) within the result 254. The output 274 of logic 264 is stored in a register C 286 for provision to the second microinstruction.

Logic 266 performs a zero-detect operation on result 254 to generate a 1-bit result 276, which is false if result 254 is zero, i.e., if the masked result 208 is zero. The output 276 of logic 266 is stored in a register D 288 for provision to the second microinstruction.

Referring now to FIG. 2B, a block diagram illustrating in detail portions of the execution unit 114 that executes the second microinstruction 108 that implements the Bit Scan instructions (BSF/BSR) according to the present invention is shown.

The execution unit 114 of FIG. 2B includes register A 282, register B 284, register C 286, and register D 288 of FIG. 2A, which store the result of the first microinstruction.

A 2:1 mux 221 receives on its two inputs the 3-bit value 211 from register B 284 and the 3-bit value 213 from register C 286 and selects one of them as its single 3-bit output 223 based on the BSR control input 236 of FIG. 2A. The mux 221 selects input 211 if the control input 236 indicates the instruction is a BSR instruction; conversely, the mux 211 selects input 213 if the control input 236 indicates the instruction is a BSF instruction. The 3 bits of output 223 are concatenated with the output 215 of register A 282 to form a 6-bit result 225. Bits [5:3] of the 6-bit result 225 are output 223 and bits [2:0] of the 6-bit result 225 are the output 215 of register A 282.

An inverter 227 receives the 6-bit result 225 and generates an inverted result 229. A 2:1 mux 231 receives on its two inputs the 6-bit value 225 and the inverted 6-bit value 229 and selects one of them as its single 6-bit output 233 based on the BSR control input 236 of FIG. 2A. The mux 231 selects input 229 if the control input 236 indicates the instruction is a BSR instruction; conversely, the mux 231 selects input 225 if the control input 236 indicates the instruction is a BSF instruction.

The 6 bits of output 233 are concatenated with '0' bits 235 to form a result 299 that is the size of the input source (i.e., 8 bits, 16 bits, or 32 bits). Bits [5:0] of the result 299 are output 233 and the remaining bits of the result 299 are the '0' bits 235.

The output 217 of register D 288 is provided to the ROB 118 of FIG. 1. The ROB 118 writes the result 299 to the destination register specified by the Bit Scan instruction only if the output 217 of register D 288 indicates that the Bit Scan instruction source operand was non-zero.

Although registers A, B, C, and D 282-288 are shown as discrete registers, in one embodiment, the 10-bit result of the first microinstruction that includes result bits 242, 272, 274, and 276 may be stored in a single register. It is noted that although various logic blocks are shown in FIG. 2 to accomplish the result described, other embodiments are contemplated to accomplish the same result with different logic implementations. For example, the embodiment shown in FIG. 3 employs different logic blocks to achieve a similar result as the embodiment of FIG. 2B.

Figure 3:
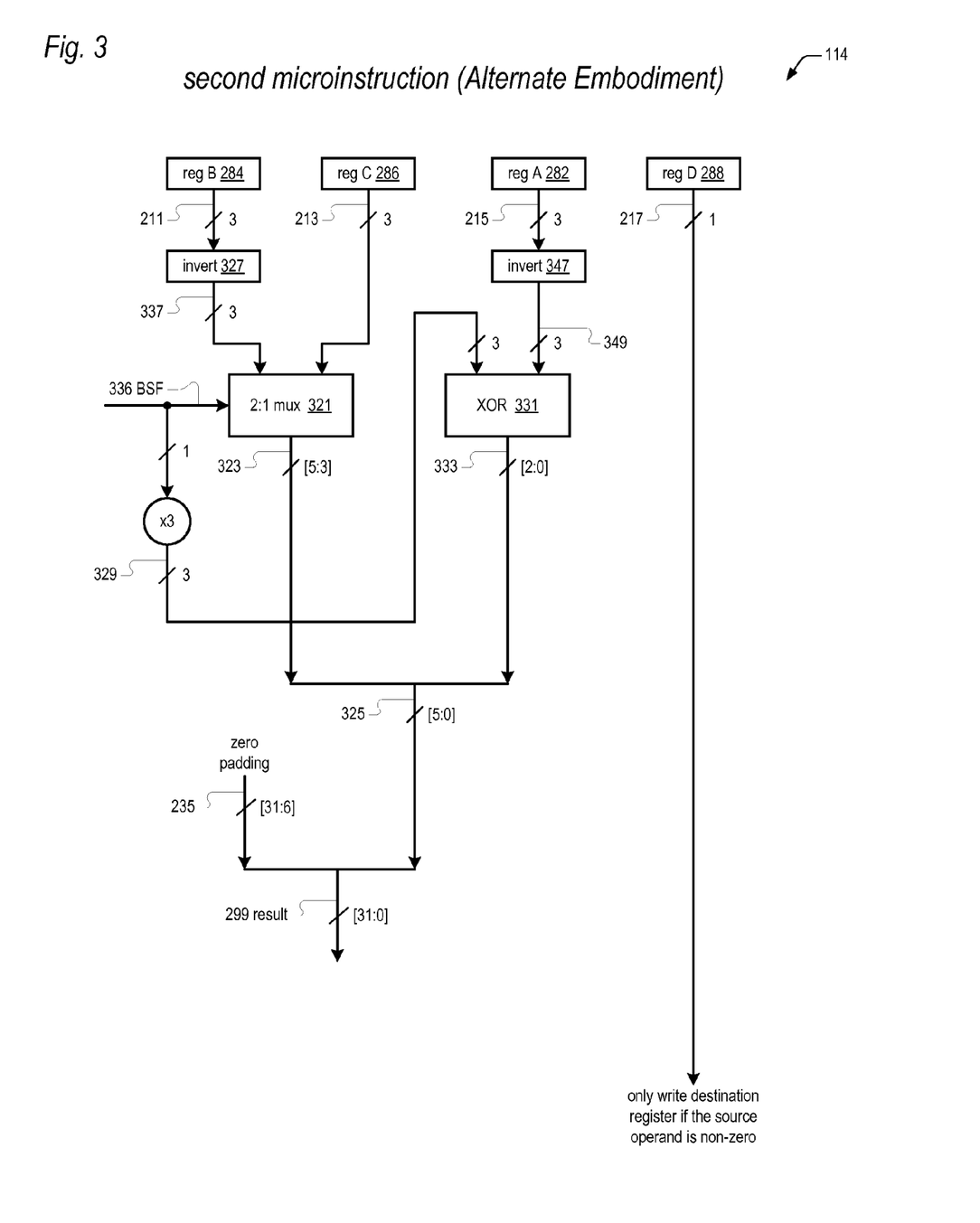
FIG. 3 is a block diagram illustrating in detail portions of the execution unit of FIG. 1 that executes the second microinstruction that implements the Bit Scan instructions (BSF/BSR) according to an alternate embodiment of the present invention.

Referring now to FIG. 3, a block diagram illustrating in detail portions of the execution unit 114 of FIG. 1 that executes the second microinstruction 108 that implements the Bit Scan instructions (BSF/BSR) according to an alternate embodiment of the present invention is shown. Portions of the embodiment of FIG. 3 are similar to portions of the embodiment of FIG. 2B and like-numbered elements are the same.

An inverter 327 receives the 3-bit output 211 of register B 284 and generates a 3-bit inverted output 337.

A 2:1 mux 321 receives on its two inputs the inverted 3-bit value 337 from inverter 327 and the 3-bit value 213 from register C 286 and selects one of them as its single 3-bit output 323 based on a BSF control input 336. The mux 321 selects input 337 if the control input 336 indicates the instruction is a BSF instruction; conversely, the mux 311 selects input 213 if the control input 336 indicates the instruction is a BSR instruction.

An inverter 347 receives the 3-bit output 215 of register A 282 and generates a 3-bit inverted output 349.

A set of three 2-input XOR gates 331 perform a Boolean XOR operation on corresponding bits of the 3-bit inverted output 349 and a second 3-bit input 329. The 3-bit input 329 is the BSF signal 336 replicated three times. The 3-bit output of the XOR gates 331 is a 3-bit result 333. Thus, if the Bit Scan instruction is a BSF instruction, the result 333 is the inverted version of the output 215 of register A 282; otherwise, the result 333 is simply the output 215 of register A 282.

The 3 bits of output 323 of the 2:1 mux 321 are concatenated with the output 333 of the XOR gates 331 to form a 6-bit result 325. Bits [5:3] of the 6-bit result 325 are output 323 and bits [2:0] of the 6-bit result 325 are the output 333 of the XOR gates 331. The 6 bits of result 325 are concatenated with '0' bits 235 to form the result 299. Bits [5:0] of the result 299 are result 325 and the remaining bits of the result 299 are the '0' bits 235.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including VERILOG HDL, very-high-speed integrated circuits (VHSIC) hardware description language (VHDL), and so on, or other available programs. Such software can be disposed in any known computer usable medium such as semiconductor, magnetic disk, or optical disc (e.g., Compact Disc Read-only memory (CD-ROM), Digitial Versatile Disc Read-only memory (DVD-ROM), etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A hardware apparatus in a microprocessor for executing a bit scan instruction, wherein the bit scan instruction specifies an input operand comprising N bytes, wherein N is at least two, the apparatus comprising:

a first encoder, configured to forward bit scan encode each of the N bytes of the input operand to generate N first bit vectors;
a zero detector, configured to zero-detect each of the N bytes of the input operand to generate a second bit vector;
a second encoder, configured to forward bit scan encode the second bit vector to generate a third bit vector; and
an N:1 multiplexor, controlled by the third bit vector to select one of the N first bit vectors to output a fourth bit vector;
wherein the apparatus concatenates the third and fourth bit vectors into a fifth bit vector that indicates the bit index of the least significant set bit of the input operand.

2. The hardware apparatus of claim 1, wherein the fourth bit vector comprises the least significant bits of the fifth bit vector.

3. The hardware apparatus of claim 1, wherein the upper bits of the fifth bit vector are zero padded to generate a sixth bit vector that indicates the bit index of the least significant set bit of the input operand.

4. The hardware apparatus of claim 1, wherein the instruction set architecture of the microprocessor allows the bit scan instruction to variably specify an input operand comprising N bytes, wherein N is any of 2, 4, and 8.

5. The hardware apparatus of claim 4, further comprising:
zero mask logic, configured to receive an 8-byte value from an 8-byte register that stores the input operand and to zero mask the 8-byte value for provision to the first encoder and to the zero detector, wherein the zero mask logic is configured to mask to zero bytes 2 through 7 of the 8-byte value when the bit scan instruction specifies a 2-byte input operand and to mask to zero bytes 4 through 7 of the 8-byte value when the bit scan instruction specifies a 4-byte input operand.

6. The hardware apparatus of claim 1, further comprising:
a third encoder, configured to forward bit scan encode a bit-reversed version of each of the N bytes of the input operand to generate N sixth bit vectors;
a fourth encoder, configured to forward bit scan encode a bit-reversed version of the second bit vector to generate a seventh bit vector;
a second N:1 multiplexor, controlled by the seventh bit vector to select one of the N sixth bit vectors to output an eighth bit vector; and
selection logic, configured to receive an input that indicates whether the bit scan instruction is a forward or reverse bit scan instruction, wherein the selection logic selects a concatenation of the third and fourth bit vectors into the fifth bit vector if the input indicates forward, wherein the selection logic selects an inverted version of a concatenation of the seventh and eighth bit vectors into the fifth bit vector if the input indicates reverse.

7. The hardware apparatus of claim 6, wherein the fourth bit vector comprises the least significant bits of the fifth bit vector if the input indicates forward, wherein an inverted version of the eighth bit vector comprises the least significant bits of the fifth bit vector if the input indicates reverse.

8. The hardware apparatus of claim 6, wherein the selection logic comprises:
a first 2:1 multiplexor, controlled to select the fourth bit vector if the instruction is a bit scan forward and to select the eighth bit vector if the instruction is a bit scan reverse, to output as a ninth bit vector;
a second 2:1 multiplexor, controlled to select the third bit vector if the instruction is a bit scan forward and to select the seventh bit vector if the instruction is a bit scan reverse, to output as a tenth bit vector; and
a third 2:1 multiplexor, controlled to select the concatenation of the tenth and ninth bit vectors if the instruction is a bit scan forward and to select the inverted version of the concatenation of the tenth and ninth bit vectors if the instruction is a bit scan reverse, to output as the fifth bit vector.

9. The hardware apparatus of claim 6, wherein the selection logic comprises:
a first 2:1 multiplexor, controlled to select the fourth bit vector if the instruction is a bit scan forward and to select the eighth bit vector if the instruction is a bit scan reverse, to output as a ninth bit vector;
a second 2:1 multiplexor, controlled to select the third bit vector if the instruction is a bit scan forward and to select an inverted version of the seventh bit vector if the instruction is a bit scan reverse, to output as a tenth bit vector; and
XOR gates, configured to perform a Boolean exclusive-OR operation on an inverted version of the ninth bit vector and a bit vector that is all Boolean one values if the instruction is a bit scan forward and is all Boolean zero values if the instruction is a bit scan reverse, to output as an eleventh bit vector;
wherein the apparatus concatenates the tenth and eleventh bit vectors into the fifth bit vector that indicates the bit index of the least significant set bit of the input operand.

10. The hardware apparatus of claim 6, wherein the instruction set architecture of the microprocessor allows the bit scan instruction to variably specify an input operand comprising N bytes, wherein N is any of 2, 4, and 8.

11. The hardware apparatus of claim 10, further comprising:
zero mask logic, configured to receive an 8-byte value from an 8-byte register that stores the input operand and to zero mask the 8-byte value for provision to the first encoder and to the zero detector, wherein the zero mask logic is configured to mask to zero bytes 2 through 7 of the 8-byte value when the bit scan instruction specifies a 2-byte input operand and to mask to zero bytes 4 through 7 of the 8-byte value when the bit scan instruction specifies a 4-byte input operand.

12. The hardware apparatus of claim 11, wherein the upper bits of the fifth bit vector are zero padded to generate a sixth bit vector that indicates the bit index of the least significant set bit of the input operand.

13. A microprocessor, comprising:
an instruction translator, configured to translate a bit scan instruction into one or more microinstructions, wherein the bit scan instruction specifies an input operand comprising N bytes, wherein N is at least two; and
at least one execution unit, configured to execute the one or more microinstructions, wherein the at least one execution unit comprises:
a first encoder, configured to forward bit scan encode each of the N bytes of the input operand to generate N first bit vectors;
a zero detector, configured to zero-detect each of the N bytes of the input operand to generate a second bit vector;
a second encoder, configured to forward bit scan encode the second bit vector to generate a third bit vector; and
an N:1 multiplexor, controlled by the third bit vector to select one of the N first bit vectors to output a fourth bit vector;

wherein the microprocessor concatenates the third and fourth bit vectors into a fifth bit vector that indicates the bit index of the least significant set bit of the input operand.

14. The microprocessor of claim 13, wherein the fourth bit vector comprises the least significant bits of the fifth bit vector.

15. The microprocessor of claim 13, wherein the upper bits of the fifth bit vector are zero padded to generate a sixth bit vector that indicates the bit index of the least significant set bit of the input operand.

16. The microprocessor of claim 13, wherein the instruction set architecture of the microprocessor allows the bit scan instruction to variably specify an input operand comprising N bytes, wherein N is any of 2, 4, and 8.

17. The microprocessor of claim 16, the at least one execution unit further comprising:
  zero mask logic, configured to receive an 8-byte value from an 8-byte register that stores the input operand and to zero mask the 8-byte value for provision to the first encoder and to the zero detector, wherein the zero mask logic is configured to mask to zero bytes 2 through 7 of the 8-byte value when the bit scan instruction specifies a 2-byte input operand and to mask to zero bytes 4 through 7 of the 8-byte value when the bit scan instruction specifies a 4-byte input operand.

18. The microprocessor of claim 13, the at least one execution unit further comprising:
  a third encoder, configured to forward bit scan encode a bit-reversed version of each of the N bytes of the input operand to generate N sixth bit vectors;
  a fourth encoder, configured to forward bit scan encode a bit-reversed version of the second bit vector to generate a seventh bit vector;
  a second N:1 multiplexor, controlled by the seventh bit vector to select one of the N sixth bit vectors to output an eighth bit vector; and
  selection logic, configured to receive an input that indicates whether the bit scan instruction is a forward or reverse bit scan instruction, wherein the selection logic selects a concatenation of the third and fourth bit vectors into the fifth bit vector if the input indicates forward, wherein the selection logic selects an inverted version of a concatenation of the seventh and eighth bit vectors into the fifth bit vector if the input indicates reverse.

19. The microprocessor of claim 18, wherein the fourth bit vector comprises the least significant bits of the fifth bit vector if the input indicates forward, wherein an inverted version of the eighth bit vector comprises the least significant bits of the fifth bit vector if the input indicates reverse.

20. The microprocessor of claim 18, wherein the selection logic comprises:
  a first 2:1 multiplexor, controlled to select the fourth bit vector if the instruction is a bit scan forward and to select the eighth bit vector if the instruction is a bit scan reverse, to output as a ninth bit vector;
  a second 2:1 multiplexor, controlled to select the third bit vector if the instruction is a bit scan forward and to select the seventh bit vector if the instruction is a bit scan reverse, to output as a tenth bit vector; and
  a third 2:1 multiplexor, controlled to select the concatenation of the tenth and ninth bit vectors if the instruction is a bit scan forward and to select the inverted version of the concatenation of the tenth and ninth bit vectors if the instruction is a bit scan reverse, to output as the fifth bit vector.

21. The microprocessor of claim 18, wherein the selection logic comprises:
  a first 2:1 multiplexor, controlled to select the fourth bit vector if the instruction is a bit scan forward and to select the eighth bit vector if the instruction is a bit scan reverse, to output as a ninth bit vector;
  a second 2:1 multiplexor, controlled to select the third bit vector if the instruction is a bit scan forward and to select an inverted version of the seventh bit vector if the instruction is a bit scan reverse, to output as a tenth bit vector; and
  XOR gates, configured to perform a Boolean exclusive-OR operation on an inverted version of the ninth bit vector and a bit vector that is all Boolean one values if the instruction is a bit scan forward and is all Boolean zero values if the instruction is a bit scan reverse, to output as an eleventh bit vector;
  wherein the microprocessor concatenates the tenth and eleventh bit vectors into the fifth bit vector that indicates the bit index of the least significant set bit of the input operand.

22. The microprocessor of claim 18, wherein the instruction set architecture of the microprocessor allows the bit scan instruction to variably specify an input operand comprising N bytes, wherein N is any of 2, 4, and 8.

23. The microprocessor of claim 22, the at least one execution unit further comprising:
  zero mask logic, configured to receive an 8-byte value from an 8-byte register that stores the input operand and to zero mask the 8-byte value for provision to the first encoder and to the zero detector, wherein the zero mask logic is configured to mask to zero bytes 2 through 7 of the 8-byte value when the bit scan instruction specifies a 2-byte input operand and to mask to zero bytes 4 through 7 of the 8-byte value when the bit scan instruction specifies a 4-byte input operand.

24. The microprocessor of claim 23, wherein the upper bits of the fifth bit vector are zero padded to generate a sixth bit vector that indicates the bit index of the least significant set bit of the input operand.

25. The microprocessor of claim 18, wherein the instruction translator is configured to translate the bit scan instruction into first and second microinstructions, wherein the at least one execution unit comprises first and second execution units, wherein the first execution unit is configured to the execution the first microinstruction, wherein the second execution unit is configured to the execution the second microinstruction.

26. The microprocessor of claim 13, wherein the first execution unit comprises the first and second and third and fourth encoders, the zero detector, and the first and second N:1 multiplexors, wherein the second execution unit comprises the selection logic.

27. The microprocessor of claim 13, further comprising:
  a register, configured to hold a result of the first microinstruction for conveyance as an input to the second microinstruction.

28. The microprocessor of claim 13, wherein the instruction translator is configured to directly translate the bit scan instruction into the one or more microinstructions rather than trapping to a microcode memory in response to decoding the bit scan instruction.

29. A method for executing a bit scan instruction in a microprocessor, wherein the bit scan instruction specifies an input operand comprising N bytes, wherein N is at least two, the method comprising:

forward bit scan encoding each of the N bytes of the input operand to generate N first bit vectors;

zero-detecting each of the N bytes of the input operand to generate a second bit vector;

forward bit scan encoding the second bit vector to generate a third bit vector;

selecting based on the third bit vector one of the N first bit vectors to output a fourth bit vector; and concatenating the third and fourth bit vectors into a fifth bit vector that indicates the bit index of the least significant set bit of the input operand.

30. The method of claim 29, wherein the fourth bit vector comprises the least significant bits of the fifth bit vector.

31. The method of claim 29, further comprising:

zero padding the upper bits of the fifth bit vector to generate a sixth bit vector that indicates the bit index of the least significant set bit of the input operand.

32. The method of claim 29, wherein the instruction set architecture of the microprocessor allows the bit scan instruction to variably specify an input operand comprising N bytes, wherein N is any of 2, 4, and 8.

33. The method of claim 32, further comprising:

receiving an 8-byte value from an 8-byte register that stores the input operand and zero masking the 8-byte value as input to said forward bit scan encoding each of the N bytes of the input operand to generate N first bit vectors and to said zero-detecting each of the N bytes of the input operand to generate a second bit vector, wherein said zero masking comprises masking to zero bytes 2 through 7 of the 8-byte value when the bit scan instruction specifies a 2-byte input operand and masking to zero bytes 4 through 7 of the 8-byte value when the bit scan instruction specifies a 4-byte input operand.

34. The method of claim 29, further comprising:

forward bit scan encoding a bit-reversed version of each of the N bytes of the input operand to generate N sixth bit vectors;

forward bit scan encoding a bit-reversed version of the second bit vector to generate a seventh bit vector;

selecting based on the seventh bit vector one of the N sixth bit vectors to output an eighth bit vector;

receiving an input that indicates whether the bit scan instruction is a forward or reverse bit scan instruction; and selecting a concatenation of the third and fourth bit vectors into the fifth bit vector if the input indicates forward, and selecting an inverted version of a concatenation of the seventh and eighth bit vectors into the fifth bit vector if the input indicates reverse.

35. The method of claim 34, wherein the fourth bit vector comprises the least significant bits of the fifth bit vector if the input indicates forward, wherein an inverted version of the eighth bit vector comprises the least significant bits of the fifth bit vector if the input indicates reverse.

36. The method of claim 34, wherein said selecting a concatenation comprises:

selecting the fourth bit vector if the instruction is a bit scan forward and selecting the eighth bit vector if the instruction is a bit scan reverse, to output as a ninth bit vector;

selecting the third bit vector if the instruction is a bit scan forward and selecting the seventh bit vector if the instruction is a bit scan reverse, to output as a tenth bit vector; and selecting the concatenation of the tenth and ninth bit vectors if the instruction is a bit scan forward and selecting the inverted version of the concatenation of the tenth and ninth bit vectors if the instruction is a bit scan reverse, to output as the fifth bit vector.

37. The method of claim 34, wherein said selecting a concatenation comprises:

selecting the fourth bit vector if the instruction is a bit scan forward and selecting the eighth bit vector if the instruction is a bit scan reverse, to output as a ninth bit vector;

selecting the third bit vector if the instruction is a bit scan forward and selecting an inverted version of the seventh bit vector if the instruction is a bit scan reverse, to output as a tenth bit vector;

Boolean exclusive-ORing an inverted version of the ninth bit vector and a bit vector that is all Boolean one values if the instruction is a bit scan forward and is all Boolean zero values if the instruction is a bit scan reverse, to output as an eleventh bit vector; and concatenating the tenth and eleventh bit vectors into the fifth bit vector that indicates the bit index of the least significant set bit of the input operand.

38. The method of claim 34, wherein the instruction set architecture of the microprocessor allows the bit scan instruction to variably specify an input operand comprising N bytes, wherein N is any of 2, 4, and 8.

39. The method of claim 38, further comprising:

receiving an 8-byte value from an 8-byte register that stores the input operand and zero masking the 8-byte value as input to said forward bit scan encoding each of the N bytes of the input operand to generate N first bit vectors and to said zero-detecting each of the N bytes of the input operand to generate a second bit vector, wherein said zero masking comprises masking to zero bytes 2 through 7 of the 8-byte value when the bit scan instruction specifies a 2-byte input operand and masking to zero bytes 4 through 7 of the 8-byte value when the bit scan instruction specifies a 4-byte input operand.

40. The method of claim 39, further comprising:

zero padding the upper bits of the fifth bit vector to generate a sixth bit vector that indicates the bit index of the least significant set bit of the input operand.

* * * * *